(No Model.)

F. A. GUNKELMANN.
SPRING VEHICLE.

No. 470,563.  Patented Mar. 8, 1892.

Witnesses.

Inventor.
Frank A. Gunkelmann

UNITED STATES PATENT OFFICE.

FRANK A. GUNKELMANN, OF MEDINA, OHIO.

SPRING-VEHICLE.

SPECIFICATION forming part of Letters Patent No. 470,563, dated March 8, 1892.

Application filed February 19, 1891. Serial No. 382,067. (No model.)

*To all whom it may concern:*

Be it known that I, FRANK A. GUNKELMANN, of Medina, in the county of Medina and State of Ohio, have invented certain new and useful Improvements in Spring-Vehicles; and I do hereby declare the following to be a full, clear, and exact description of the invention, such as will enable others skilled in the art to which it pertains to make and use the same.

My invention relates to improvements in spring-vehicles; and it consists in certain features of construction and in combination of parts hereinafter described, and pointed out in the claims.

Figure 1:
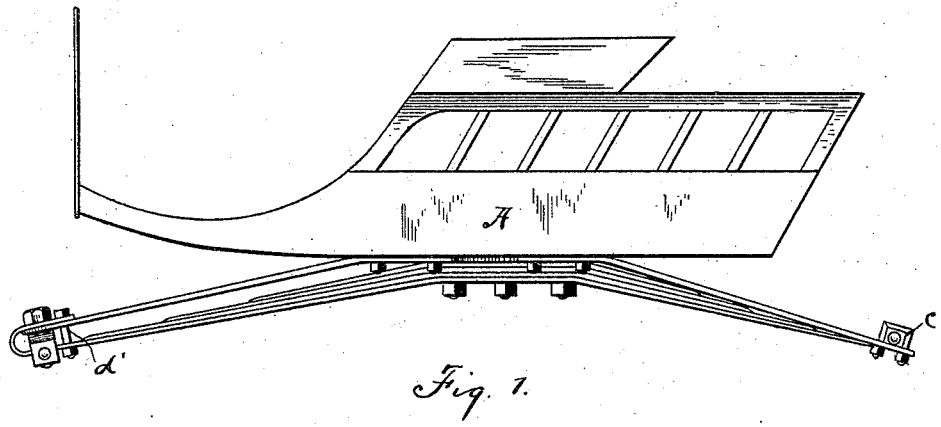
Figure 2:
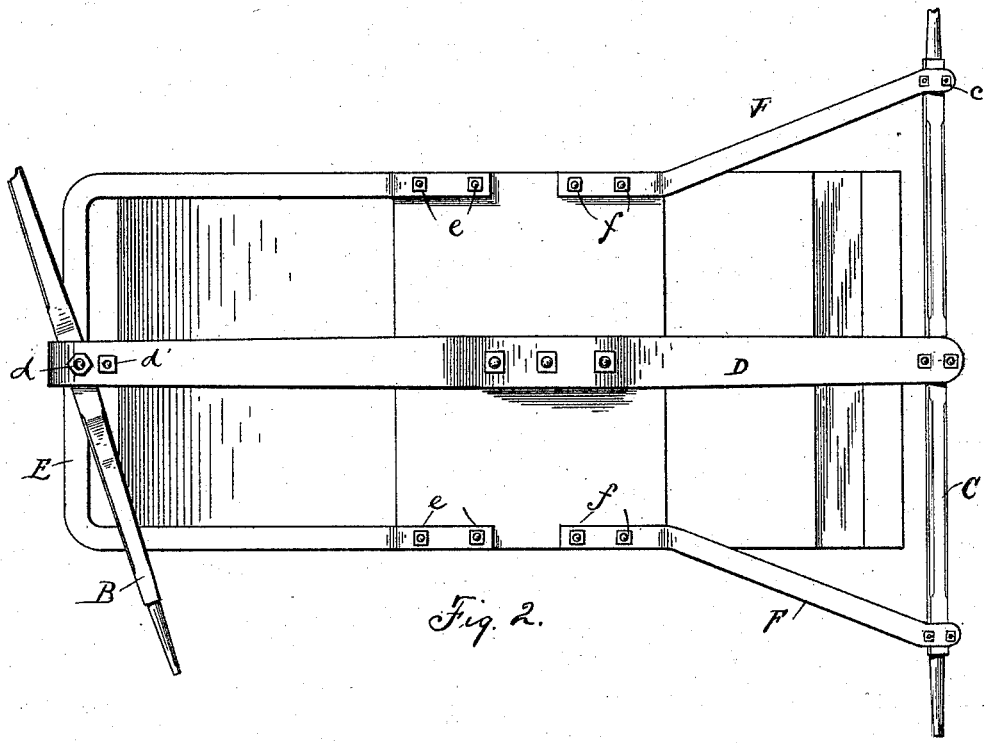

In the accompanying drawings, Figure 1 is a side elevation. Fig. 2 is a bottom plan. Fig. 3 is a plan in detail.

A represents the body of the vehicle, B the forward axle, C the rear axle, and D the principal spring, the latter extending lengthwise the vehicle and being located at the lateral center thereof. This spring is clipped to the rear axle C, the forward end of the one leaf of the spring D extending under the forward axle and the spring being bent up in front of the axle, and from thence being bent back, so as to form a goose-neck to embrace the axle and member E, the parts being secured by king-bolt $d$. A bolt $d'$ extends through the top and bottom members of the spring, this bolt being located far enough rearward of the axle to give the necessary play to the axle in turning the vehicle.

E is a flat spring bent edgewise to approximately a U shape, the central or lateral member of spring E having a hole to receive the king-bolt, the free ends of this spring extending under the vehicle-body to which they are secured by bolts, as at $e$ $e'$.

F F are flat spring-braces, the forward ends thereof extending some little distance under the bottom of the vehicle-body to which they are bolted, as at $f$ $f$, the rear ends of springs F being clipped to the rear axle, as at $c$. Members F are preferably bent more or less edgewise, so that these members diverge as they extend rearward and connect with the axle as near the spindles of the axle as is practicable.

The construction shown, while securing substantially the advantages of the construction shown and described in United States Letters Patent No. 438,543, granted to me October 14, 1890, are cheaper to construct and are considered by some as neater in appearance.

What I claim is—

1. In a spring-vehicle, the combination, with the vehicle-body and axles, of a substantially U-shaped spring having its middle part resting on the front axle and a central spring secured to the body of the vehicle and having one end bent around the U-shaped spring and the adjacent axle.

2. In a spring-vehicle, the combination, with the vehicle-body and axles, of a substantially U-shaped spring, the middle portion of which rests upon the forward axle, and a central spring secured to the body of the vehicle and having its front end passed under the axle, bent upwardly, and passed over the top of the axle and U-shaped brace, all of the parts being secured by a king-bolt, substantially as set forth.

In testimony whereof I sign this specification, in the presence of two witnesses, this 21st day of January, 1891.

FRANK A. GUNKELMANN.

Witnesses:
C. H. DORER,
WARD HOOVER.